United States Patent [19]

Whitehead

[11] Patent Number: 4,575,108
[45] Date of Patent: Mar. 11, 1986

[54] DRILL CHUCK ATTACHMENTS

[76] Inventor: Dennis M. Whitehead, 202 Terrace Ct., Trafford, Pa. 15085

[21] Appl. No.: 536,676

[22] Filed: Sep. 28, 1983

[51] Int. Cl.$^4$ ............................................. B23B 31/06
[52] U.S. Cl. ..................................... 279/59; 279/1 K; 279/64; 408/241 R
[58] Field of Search ................. 279/1 K, 1 Q, 62, 37, 279/50, 57, 59, 60, 61, 63, 64, 65; 408/124, 240, 241 R; 81/90 A

[56] References Cited

U.S. PATENT DOCUMENTS

| 3,795,406 | 3/1974 | Rohm | 279/64 X |
| 4,162,080 | 7/1979 | Buck | 408/240 X |
| 4,277,074 | 7/1981 | Kilberis | 279/60 |
| 4,317,578 | 3/1982 | Welch | 279/60 |
| 4,395,170 | 7/1983 | Clarey | 81/90 A X |
| 4,460,296 | 7/1984 | Silvertson, Sr. | 279/62 X |

Primary Examiner—Gil Weidenfeld
Assistant Examiner—Glenn L. Webb
Attorney, Agent, or Firm—Buell, Ziesenheim, Beck & Alstadt

[57] ABSTRACT

Attachments for self-locking or conventional key-operated chucks on hand drills make possible simplified operation thereof. An externally threaded ring carried by the drill surrounding the chuck is internally beveled at its outer end and mates with a threaded nut. A split ring with wedge-shaped cross section is positioned between the nut and the beveled end of the ring so as to clamp the chuck to the ring when the nut is tightened. A cap made of an elastomer attached over the nose of the chuck has in its end a slot or crossed slots which grip a drill bit when it is thrust therethrough.

3 Claims, 2 Drawing Figures

DRILL CHUCK ATTACHMENTS

This invention relates to devices used with chucks such as drill chucks designed for power operated tools. It is more particularly concerned with devices used with keyless or self-locking chucks.

BACKGROUND OF THE INVENTION

Conventional chucks for power operated drills and the like are opened and closed by use of a key. One hand of the user must operate the key leaving the other hand available to put the drill bit in the chuck or remove it and also to hold the drill if it is portable. This requirement has brought about the development of a number of keyless or self-locking chucks, so-called, which do not require the use of both hands to close or open. One such chuck is disclosed in Whitehead U.S. Pat. No. 4,423,881 of Jan. 3, 1984. That chuck has an outer rotatable sleeve threaded to the drill-gripping elements and inertial means which cause the chuck to grip the drill stem when the user holds the sleeve in one hand and starts the drill motor. The chuck grip is released by a similar operation but in which the drill motor is reversed. All keyless chucks with which I am familiar require the user to hold such a sleeve during locking and unlocking of the chuck.

Although the sleeve need be held only for a moment while the drill motor is running, some users find this requirement objectionable. Obviously, if the sleeve is held too long the drill motor wrenches it out of the grip of the holder. Another disadvantage of existing keyless chucks is that the drill bit may drop out of the chuck if the bit is not held by hand during the opening or closing operation, or may be ejected when the chuck is opened, possibly injuring the user.

SUMMARY OF THE INVENTION

I have invented a mechanism which does away with the need of holding by hand the sleeve of a self-locking chuck during locking and unlocking thereof and other mechanism for holding a drill bit in the chuck during that operation. The first mentioned mechanism comprises an externally threaded ring surrounding the chuck carried by the drill or other tool, and an auxiliary sleeve threaded thereon, together with means to clamp the chuck sleeve when the auxiliary sleeve is screwed on. The second mechanism comprises a cap made of an elastomer so as to attach over the nose of the chuck, the end of the cap having a slot or cross slots therein which grip a drill bit when it is thrust therethrough. Both mechanisms are useable with conventional key-operated chucks.

DESCRIPTION OF PREFERRED EMBODIMENT

Figure 1:
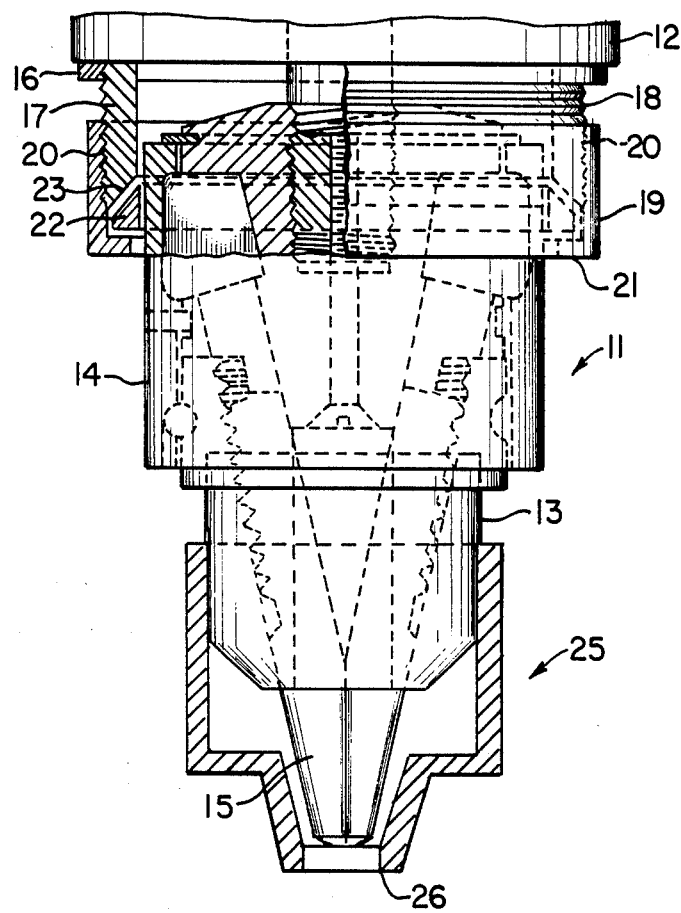
FIG. 1 is an elevation of apparatus of my invention partly in cross section fitted to a self-locking chuck.
Figure 2:
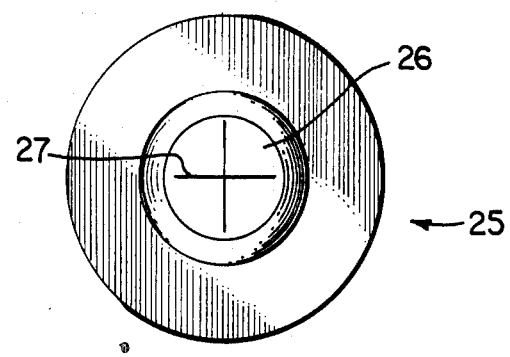
FIG. 2 is a bottom view of the lower end of the chuck of FIG. 1 and the apparatus of my invention fitted thereto.

In the figures, a keyless chuck 11 is fitted to a power drill or other device having a housing 12. The chuck comprises a body portion 13, a sleeve 14 which rotates on body portion 13 and three jaws 15 which are clamped against the drill bit stem or released therefrom by rotation of sleeve 14. Affixed to housing 12 coaxially with chuck 11 is a flange 16 which extends into ring 17 threaded around its external circumference with threads 18. A nut 19 having mating internal threads 20 is threaded on ring 17. The outer end of nut 19 extends inwardly as a flange 21 over the end face of ring 17 which at its outer end 23 is internally beveled. A split ring 22 with wedge-shaped cross section is fitted between flange 21 of nut 19 and beveled end 23 of ring 17.

In operation of my apparatus above described, nut 19 is screwed on ring 17 when chuck 11 is to be closed. The flange 21 of nut 19 forces split ring 22 into the gap between chuck sleeve 14 and ring 17, locking those elements together. With chuck sleeve 14 locked to drill housing 12 it is not necessary for the user to hold sleeve 14 by hand when he starts the drill motor. As soon as chuck 11 is closed on the drill bit the ring 19 is unscrewed sufficiently to permit free rotation of chuck 11.

My apparatus also includes a cap 25 made of an elastomer so as to attach over the end of chuck body 13 and jaws 15. The outer end 26 of cap 25 is formed with crossed slots 27 extending therethrough of length somewhat greater than the largest diameter of drill bit accepted by chuck 11. Drill bits are inserted into chuck 11 through the slots 27 of cap 25, displacing the flexible elastomeric material. That material, however, holds drill bits sufficiently to prevent them from being ejected out of chuck 11 when it is opened.

While I have shown and described a present preferred embodiment of the invention and have illustrated a present preferred method of practicing the same, it is to be distinctly understood that the invention is not limited thereto but may be otherwise variously embodied within the scope of the following claims.

I claim:

1. An attachment for a power drill having a housing and a drill chuck including a body portion, a sleeve which rotates on said body portion and jaws caused to clamp against a drill bit by rotation of said sleeve comprising an externally threaded ring surrounding said sleeve with clearance therebetween adapted for fixing to said housing, a nut threaded on said ring for rotation thereabout and wedging means positioned between said nut and said ring adapted to be forced radially inwardly and axially toward said body portion clamping said sleeve to said ring when said nut is rotated.

2. The attachment of claim 1 in which said threaded ring is internally beveled at its outer end and the means positioned between said sleeve and said ring include a split ring having a wedge-shaped cross-section mating with said bevel in said threaded ring.

3. The attachment of claim 2 in which said nut has an internally projecting flange around its outer end on which said split ring rests.

* * * * *